US011316142B2

(12) United States Patent
Jiang et al.

(10) Patent No.: US 11,316,142 B2
(45) Date of Patent: Apr. 26, 2022

(54) METHODS FOR FABRICATING SILICON-BASED ELECTRODES COMPRISING NATURALLY OCCURRING CARBONACEOUS FILAMENTS AND BATTERY CELLS UTILIZING THE SAME

(71) Applicant: GM GLOBAL TECHNOLOGY OPERATIONS LLC, Detroit, MI (US)

(72) Inventors: Meng Jiang, Rochester Hills, MI (US); Raghunathan K, Troy, MI (US); Ion C. Halalay, Grosse Pointe Park, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 16/572,789

(22) Filed: Sep. 17, 2019

(65) Prior Publication Data

US 2021/0083264 A1    Mar. 18, 2021

(51) Int. Cl.
*H01M 4/134* (2010.01)
*H01M 4/04* (2006.01)
(Continued)

(52) U.S. Cl.
CPC .......... *H01M 4/134* (2013.01); *H01M 4/0404* (2013.01); *H01M 4/0471* (2013.01);
(Continued)

(58) Field of Classification Search
None
See application file for complete search history.

(56) References Cited

U.S. PATENT DOCUMENTS 7,736,805 B2   6/2010  Nazri et al.
8,101,152 B1   1/2012  Halalay et al.
(Continued)

FOREIGN PATENT DOCUMENTS

CN    112531144 A    3/2021

OTHER PUBLICATIONS

U.S. Appl. No. 16/401,817, filed May 2, 2019.
(Continued)

*Primary Examiner* — Daniel S Gatewood
(74) *Attorney, Agent, or Firm* — Harness, Dickey & Pierce, P.L.C.

(57) ABSTRACT

Methods for fabricating electrodes include coating a current collector with a slurry to form a coated current collector. The slurry includes a dry fraction, including silicon particles, polymeric binders, and one or more types of naturally occurring carbonaceous filaments, and one or more solvents. The coated current collector is heat treated to produce the electrode having a layer of silicon-based host material. The one or more naturally occurring carbonaceous filaments can include animal fibers, chitin, alginate, cellulose, keratin, and chitosan, and can have an average length of 1 μm to 50 μm and an average diameter of 1 nm to 500 nm. The dry fraction can include 5 wt. % to 95 wt. % silicon particles, 0.1 wt. % to 15 wt. % polymeric binders, and 1 wt. % to 20 wt. % naturally occurring carbonaceous filaments. The method can include assembling a battery cell by disposing the electrode and a positive electrode in electrolyte.

17 Claims, 2 Drawing Sheets

(51) Int. Cl.
*H01M 4/62* (2006.01)
*H01M 4/38* (2006.01)

(52) U.S. Cl.
CPC ........... *H01M 4/386* (2013.01); *H01M 4/622* (2013.01); *H01M 4/625* (2013.01)

(56) References Cited

U.S. PATENT DOCUMENTS

| | | | |
|---|---|---|---|
| 8,399,138 B2 | 3/2013 | Timmons | |
| 8,420,259 B2 | 4/2013 | Xiao et al. | |
| 8,440,350 B1 | 5/2013 | Verbrugge et al. | |
| 8,642,201 B2 | 2/2014 | Cheng et al. | |
| 8,658,295 B2 | 2/2014 | Cheng et al. | |
| 8,679,680 B2 | 3/2014 | Vanimisetti et al. | |
| 8,828,481 B2 | 9/2014 | Burton et al. | |
| 8,835,056 B2 | 9/2014 | Xiao et al. | |
| 9,012,075 B2 | 4/2015 | Verbrugge et al. | |
| 9,034,519 B2 | 5/2015 | Xiao et al. | |
| 9,093,705 B2 | 7/2015 | Xiao et al. | |
| 9,142,830 B2 | 9/2015 | Xiao et al. | |
| 9,153,819 B2 | 10/2015 | Huang et al. | |
| 9,178,208 B2 | 11/2015 | Park et al. | |
| 9,356,281 B2 | 5/2016 | Verbrugge et al. | |
| 9,362,551 B2 | 6/2016 | Sachdev et al. | |
| 9,362,552 B2 | 6/2016 | Sohn et al. | |
| 9,379,374 B2 | 6/2016 | Liu et al. | |
| 9,397,338 B2 | 7/2016 | Park et al. | |
| 9,553,303 B2 | 1/2017 | Park et al. | |
| 9,583,757 B2 | 2/2017 | Park et al. | |
| 9,583,767 B2 | 2/2017 | Verbrugge et al. | |
| 9,806,328 B2 | 10/2017 | Park et al. | |
| 9,905,847 B2 | 2/2018 | Dadheech et al. | |
| 9,923,189 B2 | 3/2018 | Xiao | |
| 10,141,569 B2 | 11/2018 | Verbrugge et al. | |
| 10,164,245 B2 | 12/2018 | Huang | |
| 10,211,452 B2 | 2/2019 | Jiang et al. | |
| 10,326,136 B2 | 6/2019 | Xiao et al. | |
| 10,396,360 B2 | 8/2019 | Xiao et al. | |
| 10,424,784 B2 | 9/2019 | Yang et al. | |
| 10,622,621 B2 | 4/2020 | Xiao et al. | |
| 2011/0143206 A1* | 6/2011 | Muthu | H01M 4/1391 429/231 |
| 2012/0100403 A1 | 4/2012 | Wang et al. | |
| 2012/0229096 A1 | 9/2012 | Nazri | |
| 2012/0328927 A1 | 12/2012 | Timmons et al. | |
| 2013/0099159 A1 | 4/2013 | Halalay et al. | |
| 2017/0098817 A1 | 4/2017 | Yu et al. | |
| 2017/0200943 A1* | 7/2017 | Kawakami | H01M 4/0471 |
| 2017/0271678 A1 | 9/2017 | Yang et al. | |
| 2017/0324119 A1 | 11/2017 | Powell, Jr. et al. | |
| 2017/0331115 A1* | 11/2017 | Saito | C08F 14/185 |
| 2018/0287129 A1* | 10/2018 | Park | H01M 4/669 |
| 2020/0119339 A1 | 4/2020 | Halalay et al. | |
| 2020/0350558 A1 | 11/2020 | Jimenez et al. | |

OTHER PUBLICATIONS

Li, Jin-Yi et al., "Research progress regarding Si-based anode materials towards practical application in high energy density Li-ion batteries." Materials Chemistry Frontiers, vol. 1, No. 9, pp. 1691-1708 (2017).

* cited by examiner

METHODS FOR FABRICATING SILICON-BASED ELECTRODES COMPRISING NATURALLY OCCURRING CARBONACEOUS FILAMENTS AND BATTERY CELLS UTILIZING THE SAME

INTRODUCTION

Lithium ion batteries describe a class of rechargeable batteries in which lithium ions move between a negative electrode (i.e., anode) and a positive electrode (i.e., cathode). Liquid, solid, and polymer electrolytes can facilitate the movement of lithium ions between the anode and cathode. Lithium-ion batteries are growing in popularity for defense, automotive, and aerospace applications due to their high energy density and ability to undergo successive charge and discharge cycles.

SUMMARY

Methods for fabricating electrodes are provided, and can include coating a current collector with a slurry to form a coated current collector, and heat treating the coated current collector to produce the electrode comprising a layer of silicon-based host material. The slurry can include one or more solvents and a dry fraction including silicon particles, one or more polymeric binders, and one or more types of naturally occurring carbonaceous filaments. The one or more naturally occurring carbonaceous filaments can include animal fibers, chitin, alginate, cellulose, keratin, and chitosan. The one or more naturally occurring carbonaceous filaments can be selected from the group consisting only of animal fibers, chitin, alginate, cellulose, keratin, and chitosan. The one or more naturally occurring carbonaceous filaments can have an average length of about 1 μm to about 50 μm and an average diameter of about 1 nm to about 500 nm. The carbon present in the silicon-based host material can consist only of carbon derived from the one or more polymeric binders and the one or more naturally occurring carbonaceous filaments, and optionally carbon contributed from the current collector. The dry fraction can further include conductive carbon. The dry fraction can include up to about 10 wt. % conductive carbon. The dry fraction can further include one or more synthetic carbonaceous filaments. The one or more synthetic carbonaceous filaments can include nylon, modacrylic, olefin, acrylic, polyester, rayon, vinyon, polyethylene, polyether-polyurea copolymers, vinalon, aramids, polybenzimidazole, polylactic acid, polyhydroquinone-diimidazopyridine, thermoset liquid-crystalline polyoxazoles, aromatic polyesters, and derclon. The dry fraction can include about 5 wt. % to about 95 wt. % silicon particles, about 0.1 wt. % to about 15 wt. % polymeric binders, and about 1 wt. % to about 20 wt. % naturally occurring carbonaceous filaments. Heat treating can include heating the coated current collector to a temperature between about 250° C. to about 1200° C. The heat treating can occur in an atmosphere substantially free of oxygenated gases.

Methods for fabricating battery cells are provided, and can include coating a current collector with a slurry to form a coated current collector, heat treating the coated current collector in an atmosphere substantially free of oxygenated gases to produce a negative electrode having a layer of silicon-based host material, and subsequently assembling the battery cell by disposing the negative electrode and a positive electrode in an electrolyte. The slurry can include one or more solvents and a dry fraction including silicon particles, one or more polymeric binders, and one or more types of naturally occurring carbonaceous filaments, wherein the one or more naturally occurring carbonaceous filaments comprises an average length of about 1 μm to about 50 μm and an average diameter of about 1 nm to about 500 nm. The thickness of the silicon-based host material layer can be about 20 μm to about 50 μm. The one or more naturally occurring carbonaceous filaments can include animal fibers, chitin, alginate, cellulose, keratin, and chitosan. The one or more naturally occurring carbonaceous filaments can be selected from the group consisting only of animal fibers, chitin, alginate, cellulose, keratin, and chitosan. The carbon present in the silicon-based host material can consist only of carbon derived from the one or more polymeric binders and the one or more naturally occurring carbonaceous filaments, and optionally carbon contributed from the current collector. The dry fraction can include about 5 wt. % to about 95 wt. % silicon particles, about 0.1 wt. % to about 15 wt. % polymeric binders, and about 1 wt. % to about 20 wt. % naturally occurring carbonaceous filaments. The dry fraction can further include conductive carbon. The dry fraction can include up to about 10 wt. % conductive carbon.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are methods for fabricating electrodes and battery cells comprising silicon-based host materials. The methods provide high capacity electrodes with high mechanical strength, minimal irreversible capacity loss during the first formation cycle, and improved capacity retention during prolonged cycling. The silicon-based host materials comprise heat treated naturally occurring carbonaceous filaments defining a mechanically robust and electrically conductive matrix in which silicon particles and expand and contract without compromising the physical integrity of the electrodes and battery cells.

Figure 1:
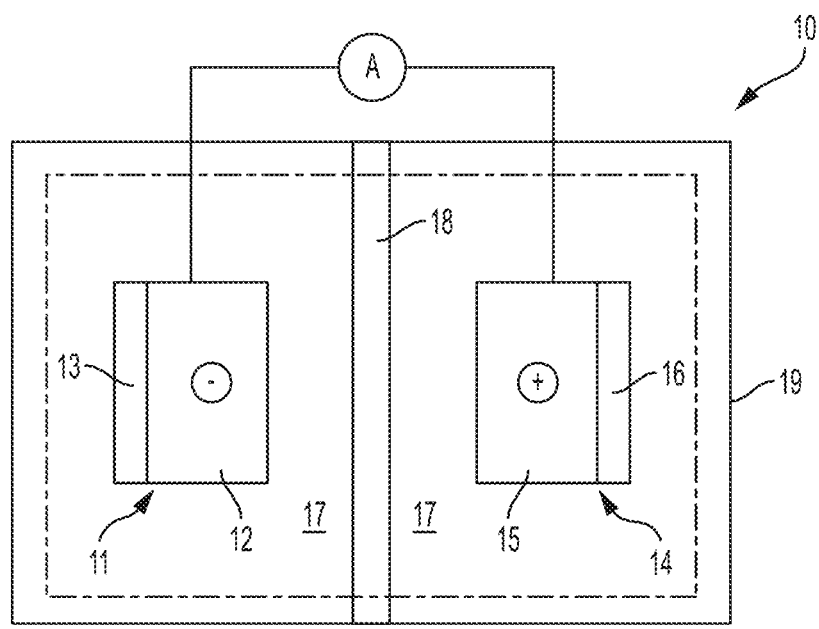
FIG. 1 illustrates a lithium battery cell, according to one or more embodiments.

FIG. 1 illustrates a lithium battery cell 10 comprising a negative electrode (i.e., the anode) 11, a positive electrode (i.e., the cathode) 14, an electrolyte 17 operatively disposed between the Anode 11 and the cathode 14, and a separator 18. Anode 11, cathode 14, and electrolyte 17 can be encapsulated in container 19, which can be a hard (e.g., metallic) case or soft (e.g., polymer) pouch, for example. The Anode 11 and cathode 14 are situated on opposite sides of separator 18 which can comprise a microporous polymer or other suitable material capable of conducting lithium ions and optionally electrolyte (i.e., liquid electrolyte). Electrolyte 17 is a liquid electrolyte comprising one or more lithium salts dissolved in a non-aqueous solvent. Anode 11 generally includes a current collector 12 and a lithium intercalation host material 13 applied thereto. Cathode 14 generally includes a current collector 15 and a lithium-based or chalcogen-based active material 16 applied thereto. For example, the battery cell 10 can comprise a chalcogen active material 16 or a lithium metal oxide active material 16, among many others, as will be described below. Active material 16 can store lithium ions at a higher electric potential than intercalation host material 13, for example. The current collectors 12 and 15 associated with the two electrodes are connected by an interruptible external circuit that allows an electric current to pass between the electrodes to electrically balance the related migration of lithium ions. Although FIG. 1 illustrates host material 13 and active material 16 schematically for the sake of clarity, host material 13 and active material 16 can comprise an exclusive interface between the anode 11 and cathode 14, respectively, and electrolyte 17.

Figure 2:
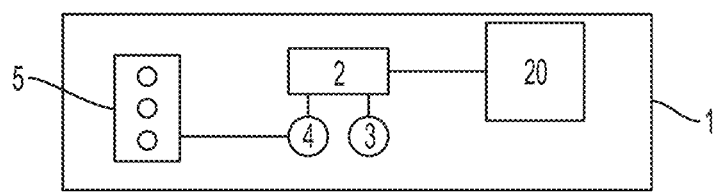
FIG. 2 illustrates a schematic diagram of a hybrid-electric vehicle, according to one or more embodiments.

Battery cell 10 can be used in any number of applications. For example, FIG. 2 illustrates a schematic diagram of a hybrid-electric or electric vehicle 1 including a battery pack 20 and related components. A battery pack such as the battery pack 20 can include a plurality of battery cells 10. A plurality of battery cells 10 can be connected in parallel to form a group, and a plurality of groups can be connected in series, for example. One of skill in the art will understand that any number of battery cell connection configurations are practicable utilizing the battery cell architectures herein disclosed, and will further recognize that vehicular applications are not limited to the vehicle architecture as described. Battery pack 20 can provide energy to a traction inverter 2 which converts the direct current (DC) battery voltage to a three-phase alternating current (AC) signal which is used by a drive motor 3 to propel the vehicle 1 via one or more wheels (not shown). An optional engine 5 can be used to drive a generator 4, which in turn can provide energy to recharge the battery pack 20 via the inverter 2. In some embodiments, drive motor 3 and generator 4 comprise a single device (i.e., a motor/generator). External (e.g., grid) power can also be used to recharge the battery pack 20 via additional circuitry (not shown). Engine 5 can comprise a gasoline or diesel engine, for example.

Battery cell 10 generally operates by reversibly passing lithium ions between Anode 11 and cathode 14. Lithium ions move from cathode 14 to Anode 11 while charging, and move from Anode 11 to cathode 14 while discharging. At the beginning of a discharge, Anode 11 contains a high concentration of intercalated/alloyed lithium ions while cathode 14 is relatively depleted, and establishing a closed external circuit between Anode 11 and cathode 14 under such circumstances causes intercalated/alloyed lithium ions to be extracted from Anode 11. The extracted lithium atoms are split into lithium ions and electrons as they leave an intercalation/alloying host at an electrode-electrolyte interface. The lithium ions are carried through the micropores of separator 18 from Anode 11 to cathode 14 by the ionically conductive electrolyte 17 while, at the same time, the electrons are transmitted through the external circuit from Anode 11 to cathode 14 to balance the overall electrochemical cell. This flow of electrons through the external circuit can be harnessed and fed to a load device until the level of intercalated/alloyed lithium in the negative electrode falls below a workable level or the need for power ceases.

Battery cell 10 may be recharged after a partial or full discharge of its available capacity. To charge or re-power the lithium ion battery cell, an external power source (not shown) is connected to the positive and the negative electrodes to drive the reverse of battery discharge electrochemical reactions. That is, during charging, the external power source extracts the lithium ions present in cathode 14 to produce lithium ions and electrons. The lithium ions are carried back through the separator by the electrolyte solution, and the electrons are driven back through the external circuit, both towards Anode 11. The lithium ions and electrons are ultimately reunited at the negative electrode, thus replenishing it with intercalated/alloyed lithium for future battery cell discharge.

Lithium ion battery cell 10, or a battery module or pack comprising a plurality of battery cells 10 connected in series and/or in parallel, can be utilized to reversibly supply power and energy to an associated load device. Lithium ion batteries may also be used in various consumer electronic devices (e.g., laptop computers, cameras, and cellular/smart phones), military electronics (e.g., radios, mine detectors, and thermal weapons), aircrafts, and satellites, among others. Lithium ion batteries, modules, and packs may be incorporated in a vehicle such as a hybrid electric vehicle (HEV), a battery electric vehicle (BEV), a plug-in HEV, or an extended-range electric vehicle (EREV) to generate enough power and energy to operate one or more systems of the vehicle. For instance, the battery cells, modules, and packs may be used in combination with a gasoline or diesel internal combustion engine to propel the vehicle (such as in hybrid electric vehicles), or may be used alone to propel the vehicle (such as in battery powered vehicles).

Returning to FIG. 1, electrolyte 17 conducts lithium ions between anode 11 and cathode 14, for example during charging or discharging the battery cell 10. The electrolyte 17 comprises one or more solvents, and one or more lithium salts dissolved in the one or more solvents. Suitable solvents can include cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,3-dimethoxypropane, 1,2-dimethoxyethane (DME), 1-2-diethoxyethane, ethoxymethoxyethane), cyclic ethers (tetrahydrofuran, 2-methyltetrahydrofuran, 1,3-dioxolane), and combinations thereof. A non-limiting list of lithium salts that can be dissolved in the organic solvent(s) to form the non-aqueous liquid electrolyte solution include $LiClO_4$, $LiAlCl_4$, $LiI$, $LiBr$, $LiSCN$, $LiBF_4$, $LiB(C_6H_5)_4$ $LiAsF_6$, $LiCF_3SO_3$, $LiN(CF_3SO_2)_2$, $LiN(FSO_2)_2$, $LiPF_6$, and mixtures thereof.

The microporous polymer separator 18 can comprise, in one embodiment, a polyolefin. The polyolefin can be a homopolymer (derived from a single monomer constituent) or a heteropolymer (derived from more than one monomer constituent), either linear or branched. If a heteropolymer derived from two monomer constituents is employed, the polyolefin can assume any copolymer chain arrangement including those of a block copolymer or a random copolymer. The same holds true if the polyolefin is a heteropolymer derived from more than two monomer constituents. In one embodiment, the polyolefin can be polyethylene (PE), polypropylene (PP), or a blend of PE and PP. The microporous polymer separator 18 may also comprise other polymers in addition to the polyolefin such as, but not limited to, polyethylene terephthalate (PET), polyvinylidene fluoride (PVdF), and or a polyamide (Nylon). Separator 18 can optionally be ceramic-coated with materials including one or more of ceramic type aluminum oxide (e.g., $Al_2O_3$), and lithiated zeolite-type oxides, among others. Lithiated zeolite-type oxides can enhance the safety and cycle life performance of lithium ion batteries, such as battery cell 10. Skilled artisans will undoubtedly know and understand the many available polymers and commercial products from which the microporous polymer separator 18 may be fabricated, as well as the many manufacturing methods that may be employed to produce the microporous polymer separator 18.

Active material 16 can include any lithium-based active material that can sufficiently undergo lithium intercalation and deintercalation while functioning as the positive terminal of battery cell 10. Active material 16 can also include a polymeric binder material to structurally hold the lithium-based active material together. The active material 16 can comprise lithium transition metal oxides (e.g., layered lithium transitional metal oxides) or chalcogen materials. Cathode current collector 15 can include aluminum or any other appropriate electrically conductive material known to skilled artisans, and can be formed in a foil or grid shape. Cathode current collector 15 can be treated (e.g., coated) with highly electrically conductive materials, including one or more of conductive carbon black, graphite, carbon nanotubes, carbon nanofiber, graphene, and vapor growth carbon fiber (VGCF), among others. The same highly electrically conductive materials can additionally or alternatively be dispersed within the host material 13.

Lithium transition metal oxides suitable for use as active material 16 can comprise one or more of spinel lithium manganese oxide ($LiMn_2O_4$), lithium cobalt oxide (LiCoO$_2$), a nickel-manganese oxide spinel ($Li(Ni_{0.5}Mn_{1.5})O_2$), a layered nickel-manganese-cobalt oxide (having a general formula of $xLi_2MnO_3 \cdot (1-x)LiMO_2$, where M is composed of any ratio of Ni, Mn and/or Co). A specific example of the layered nickel-manganese oxide spinel is $xLi_2MnO_3 \cdot (1-x)Li(Ni_{1/3}Mn_{1/3}Co_{1/3})O_2$. Other suitable lithium-based active materials include $Li(Ni_{1/3}Mn_{1/3}Co_{1/3})O_2$), $LiNiO_2$, $Li_{x+y}Mn_{2-y}O_4$ (LMO, 0<x<1 and 0<y<0.1), or a lithium iron polyanion oxide, such as lithium iron phosphate ($LiFePO_4$) or lithium iron fluorophosphate ($Li_2FePO_4F$). Other lithium-based active materials may also be utilized, such as $LiNi_xM_{1-x}O_2$ (M is composed of any ratio of Al, Co, and/or Mg), $LiNi_{1-x}Co_{1-y}Mn_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$ or NCA), aluminum stabilized lithium manganese oxide spinel ($Li_xMn_{2-x}Al_yO_4$), lithium vanadium oxide ($LiV_2O_5$), $Li_2MSiO_4$ (M is composed of any ratio of Co, Fe, and/or Mn), and any other high efficiency nickel-manganese-cobalt material (HE-NMC, NMC or $LiNiMnCoO_2$). By "any ratio" it is meant that any element may be present in any amount. So, for example, M could be Al, with or without Co and/or Mg, or any other combination of the listed elements. In another example, anion substitutions may be made in the lattice of any example of the lithium transition metal based active material to stabilize the crystal structure. For example, any O atom may be substituted with an F atom.

Chalcogen-based active material can include one or more sulfur and/or one or more selenium materials, for example. Sulfur materials suitable for use as active material 16 can comprise sulfur carbon composite materials, $S_8$, $Li_2S_8$, $Li_2S_6$, $Li_2S_4$, $Li_2S_2$, $Li_2S$, $SnS_2$, and combinations thereof. Another example of sulfur-based active material includes a sulfur-carbon composite. Selenium materials suitable for use as active material 16 can comprise elemental selenium, $Li_2Se$, selenium sulfide alloys, $SeS_2$, $SnSe_xS_y$ (e.g., $SnSe_{0.5}S_{0.5}$) and combinations thereof. The chalcogen-based active material of the positive electrode 22' may be intermingled with the polymeric binder and the conductive filler. Suitable binders include polyvinylidene fluoride (PVDF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material known to skilled artisans. Other suitable binders include polyvinyl alcohol (PVA), sodium alginate, or other water-soluble binders. The polymeric binder structurally holds the chalcogen-based active material and the conductive filler together. An example of the conductive filler is a high surface area carbon, such as acetylene black or activated carbon. The conductive filler ensures electron conduction between the positive-side current collector 26 and the chalcogen-based active material. In an example, the positive electrode active material and the polymer binder may be encapsulated with carbon. In an example, the weight ratio of S and/or Se to C in the positive electrode 22' ranges from 1:9 to 9:1.

The anode current collector 12 can include copper, nickel, copper-nickel alloys, or any other appropriate electrically conductive material known to skilled artisans. Anode current collector 12 can be treated (e.g., coated) with highly electrically conductive materials, including one or more of chromium, conductive carbon black, graphite, carbon nanotubes, carbon nanofiber, graphene, and vapor growth carbon fiber (VGCF), among others. The current collector surfaces can be roughened, and/or the current collector can be perforated, for example. Silicon has the highest known theoretical charge capacity for lithium, making it one of the most promising anode host materials 13 for rechargeable lithium-ion batteries. Accordingly, provided herein are electrodes comprising silicon-based host materials (13), and methods for fabricating the same.

Figure 3:
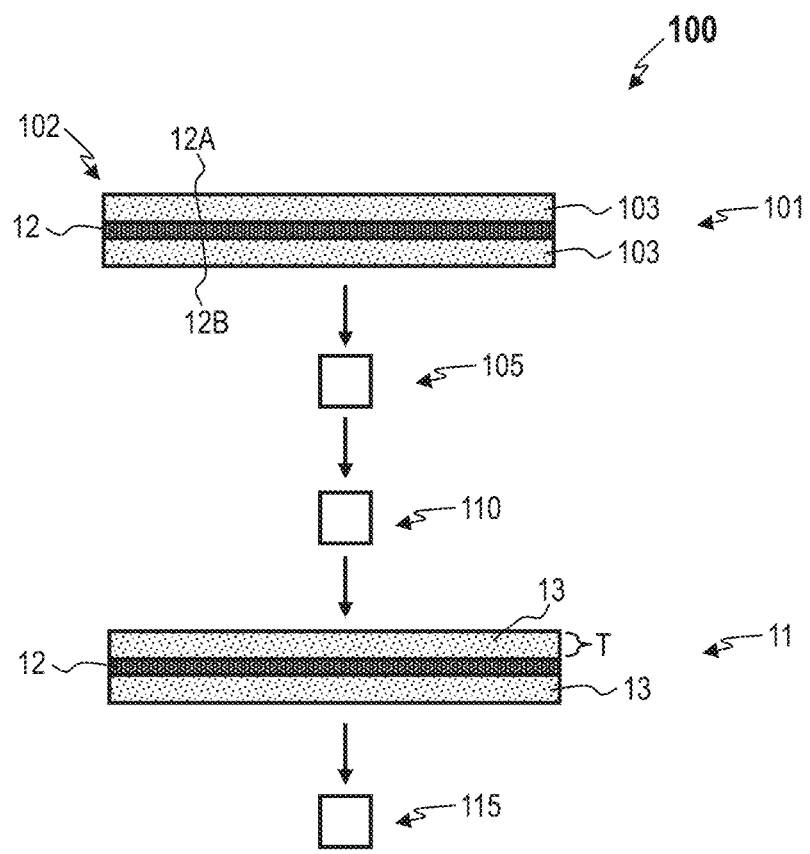
FIG. 3 illustrates a method for fabricating an electrode and battery utilizing the same, according to one or more embodiments.

FIG. 3 illustrates a method for fabricating an electrode (e.g., anode 11) and battery cells (e.g., battery cell 10) utilizing the same. Method 100 comprises coating 101 a current collector 12 with a slurry 103 to form a coated current collector 102, heat treating 110 the coated current collector 102 to produce the electrode (anode 11) comprising at least one layer of silicon-based host material 13. As shown in FIG. 3, current collector 12 has one or more faces (e.g., a first current collector face 12A and a second current collector face 12B) to which the slurry 103 can be applied.

Method 100 can further comprise, after coating 101 and prior to heat treating 110, drying 105 the coated current collector 102. Method 100 can further comprise subsequently assembling 115 the battery cell (e.g., battery cell 10) by disposing the electrode (e.g., anode 11) and a positive electrode (e.g., cathode 14) in an electrolyte (e.g., electrolyte 17). Assembling 115 the battery cell can also include disposing a separator (e.g., separator 18) between the electrode (e.g., anode 11) and the positive electrode (e.g., cathode 14).

The slurry 103 comprises a dry fraction and one or more solvents. The dry fraction comprises silicon particles, one or more polymeric binders, and one or more types of naturally occurring carbonaceous filaments. The amount of solvent utilized in the slurry is tailored to achieve a particular slurry viscosity and/or any other physical characteristic suitable for the application of the slurry 103 to the current collector. The slurry can comprise about 5 wt. % dry fraction to about 50 wt. % dry fraction. For example, the slurry can comprise about 25 wt. % to about 30 wt. % dry fraction and about 70 wt. % to about 75 wt. % solvent(s), in one embodiment. The solvent(s) can comprise any polar solvents, including N-Methyl-2-pyrrolidone (NMP), dimethyl formamide, dimethyl sulfoxide, propylene carbonate, ethylene carbonate, acetone, and methyl ethyl ketone, among others. In some embodiments, the slurry comprises 100 wt. % dry fraction and no solvent(s).

The silicon particles can comprise elemental silicon particles, period table Group V (e.g., P, As, Sb, Bi) n-type doped silicon particles, silicon alloy particles (e.g., Si—Fe, Si—Al, and Al—Mg—Si alloys), silicon-carbon composite particles (i.e., silicon particles in combination with conductive carbon materials), and/or $Li_2Si$ particles. Silicon particles can additionally or alternatively comprise $SiO_x$, wherein generally $x \leq 2$. In some embodiments, for some $SiO_x$ particles, $x \approx 1$. For example, x can be about 0.9 to about 1.1, or about 0.99 to about 1.01. Within a body of $SiO_x$ particles, $SiO_2$ and/or Si domains may further exist. In some embodiments, the silicon particles can be considered "single phase" and not include any added conductive carbon (e.g., graphite).

Utilizing $Li_2Si$ particles can help prevent volumetric expansion of silicon particles, and irreversible capture of lithium from the cathode 14 during initial cycling of a battery cell 10. The silicon particles can have an average particle diameter of less than about 10 μm, about 50 nm to about 10 μm, or about 3 μm to about 10 μm in some embodiments. In some embodiments, particularly battery cells 10 configured for fast charging, the silicon particles can have an average particle diameter of about 1 μm to about 3 μm, or about 0.15 μm to about 1 μm. In some embodiments, the dry fraction can comprise about 5 wt. % to about 95 wt. % silicon particles. In other embodiments, the dry fraction can comprise at least about 70 wt. % silicon particles, at least about 75 wt. % silicon particles, or about 75 wt. % to about 95 wt. % silicon particles. In embodiments utilizing $Li_2Si$ particles, the amount of lithium atoms can substantially equal the amount of silicon atoms in the dry fraction. For example, the silicon particles can comprise about 45% to about 50% (by count) of the total of silicon and lithium atoms.

The one or more polymeric binders can comprise polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), Li-PAA, Na-PAA, Na-alginate, Li-PAA, cross-linked polyacrylic acid-polyethylenimine, polyimide, polyvinyl alcohol (PVA), sodium alginate, nitrile butadiene rubber (NBR), polyacrylonitrile (PAN), and/or one or more fluorinated polymers (e.g., polyvinylidiene fluoride (PVDF), polytetrafluoroethylene (PTFE), fluorinated ethylene propylene (FEP), perfluoroalkoxy alkanes (PFA)), or any other suitable binder material known to skilled artisans. The polymeric binder can comprise up to about 10 wt. %, about 0.1 wt. % to about 15 wt. %, or about 1 wt. % to about 10 wt. % of the dry fraction.

The dry fraction can comprise about 1 wt. % to about 20 wt. % naturally occurring carbonaceous filaments. The naturally occurring carbonaceous filaments can have an average diameter of at least about 1 nm, or have an average diameter of about 1 nm to about 500 nm. The naturally occurring carbonaceous filaments can have an average length of at least about 1 μm, or about 1 μm to about 50 μm. The naturally occurring carbonaceous filaments provide stiffness and mechanical integrity to the host material 13 while being electrically conductive. The naturally occurring carbonaceous filaments can comprise animal fibers, chitin, alginate, cellulose, keratin, and chitosan. In some embodiments, the naturally occurring carbonaceous filaments can be selected from the group consisting of animal fibers, chitin, alginate, cellulose, keratin, and chitosan. In some embodiments, the dry fraction can optionally further comprise one or more synthetic carbonaceous filaments. Suitable synthetic carbonaceous filaments generally have high carbon content (e.g., >70 wt. % carbon) and are resistive to acid. Suitable synthetic carbonaceous filaments can include nylon, modacrylic, olefin, acrylic, polyester, rayon, vinyon, polyethylene, polyether-polyurea copolymers, vinalon, aramids, polybenzimidazole, polylactic acid, polyhydroquinone-diimidazopyridine, thermoset liquid-crystalline polyoxazoles, aromatic polyesters, and derclon.

Accordingly, in some embodiments, the dry fraction comprises about 5 wt. % to about 95 wt. % silicon particles, about 0.1 wt. % to about 15 wt. % polymeric binders, and about 1 wt. % to about 20 wt. % naturally occurring carbonaceous filaments. In some embodiments, the carbon present in the silicon-based host material 13 consists of carbon derived from the one or more polymeric binders and the one or more naturally occurring carbonaceous filaments, and optionally carbon contributed from the current collector.

The dry fraction can optionally further include up to about 10 wt. % conductive carbon. Conductive carbon can include one or more of conductive carbon black, graphite, carbon nanotubes, carbon nanofiber, graphene, acetylene black, and vapor growth carbon fiber (VGCF), among others.

Subsequent to coating 101 and prior to heat treating 110, the coated current collector 102 can be dried 105. Drying 105 substantially removes the solvent(s) from the slurry, generally by evaporation, and accordingly suitable solvents can be considered volatile organic compounds. Drying 105 can occur at temperatures below about 100° C. or below about 200° C., and can occur in an open air (e.g., non-inert) environment. In some embodiments, drying can occur at higher temperatures (e.g., up to about 500° C.), and utilize significantly shorter drying times relative to lower temperature (e.g., 100° C.) drying methods. Drying prevents the slurry solvent(s) from introducing oxides during heat treating. Heat treating 110 preferably occurs in an environment substantially free of oxygenated gases (e.g., $O_2$, CO, $CO_2$, etc.), or an "inert atmosphere". An inert atmosphere can comprise an $N_2$, Ar, and/or He atmosphere, or a vacuum, for example. Heat treating can comprise heating the coated current collector 102 to a temperature between about 250° C. to about 1200° C., for example.

Figure 4:
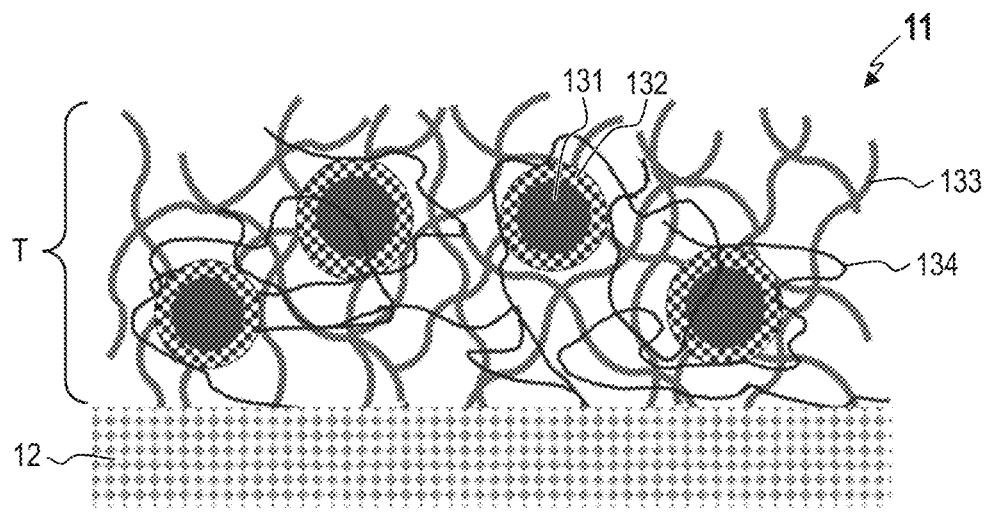
FIG. 4 illustrates a schematic cross-sectional side view of a heat treated electrode, according to one or more embodiments.

FIG. 4 illustrates a schematic cross-sectional side view of a heat treated 110 electrode (i.e., anode 11). Heat treating 110 carbonizes the polymeric binder(s), naturally occurring carbonaceous filaments 133, and optionally synthetic carbonaceous filaments 134 to create a carbon layer 132 around the silicon particles 131 to buffer silicon particle 131 expansion and further anchor the naturally occurring carbonaceous filaments 133 to the silicon particles 131, the current collector 12, and optionally the synthetic carbonaceous filaments 134. In some embodiments, heat treating 110 can comprise heating at a first temperature, and subsequently heating at a second temperature wherein the first temperature is higher than the first temperature. Heat treating 110 at a first temperature and a second temperature can more suitably convert the polymeric binder(s) to a desired material with desired mechanical and/or electrical properties. For example, polymeric compounds can be dehydrogenated at the second temperature. Dehydrogenation can increase the electronic conductivity of the polymeric binders. The heat treating duration can be tuned to the thickness T of the host material layer 13, wherein a thinner host material 13 layer generally requires a shorter heat treating duration. In some embodiments, the thickness T of the silicon-based host material 13 layer is about 20 μm to about 50 μm, or up to about 50 μm.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for fabricating an electrode, the method comprising:
    coating a current collector with a slurry to form a coated current collector, wherein the slurry includes:
        a dry fraction comprising:
            silicon particles,
            one or more polymeric binders,
            one or more types of naturally occurring carbonaceous filaments,
            one or more solvents, and
            one or more synthetic carbonaceous filaments, wherein the one or more synthetic carbonaceous filaments include nylon, modacrylic, olefin, acrylic, polyester, rayon, vinyon, polyethylene, polyether-polyurea copolymers, vinalon, aramids, polybenzimidazole, polyhydroquinone-diimidazopyridine, thermoset liquid-crystalline polyoxazoles, aromatic polyesters, and derclon; and
    heat treating the coated current collector to produce the electrode comprising an electroactive material layer comprising a silicon-based host material on the current collector.

2. The method of claim 1, wherein the one or more naturally occurring carbonaceous filaments comprise animal fibers, chitin, alginate, cellulose, keratin, and chitosan.

3. The method of claim 1, wherein the one or more naturally occurring carbonaceous filaments are selected from the group consisting of animal fibers, chitin, alginate, cellulose, keratin, and chitosan.

4. The method of claim 1, wherein the one or more naturally occurring carbonaceous filaments comprises an average length of about 1 μm to about 50 μm and an average diameter of about 1 nm to about 500 nm.

5. The method of claim 1, wherein the carbon present in the silicon-based host material consists of carbon derived from the one or more polymeric binders and the one or more naturally occurring carbonaceous filaments, and optionally carbon contributed from the current collector.

6. The method of claim 1, wherein the dry fraction further comprises conductive carbon.

7. The method of claim 6, wherein the dry fraction comprises up to about 10 wt. % conductive carbon.

8. The method of claim 1, wherein the dry fraction comprises about 5 wt. % to about 95 wt. % silicon particles, about 0.1 wt. % to about 15 wt. % polymeric binders, and about 1 wt. % to about 20 wt. % naturally occurring carbonaceous filaments.

9. The method of claim 1, wherein heat treating comprises heating the coated current collector to a temperature between about 250° C. to about 1200° C.

10. The method of claim 9, wherein heat treating occurs in an atmosphere substantially free of oxygenated gases.

11. A method for fabricating a battery cell, the method comprising:
    coating a current collector with a slurry to form a coated current collector, wherein the slurry includes:
    a dry fraction comprising:
        silicon particles,
        one or more polymeric binders,
        one or more types of naturally occurring carbonaceous filaments, wherein the one or more naturally occurring carbonaceous filaments comprises an average length of about 1 μm to about 50 μm and an average diameter of about 1 nm to about 500 nm,
        one or more solvents, and
        one or more synthetic carbonaceous filaments, wherein the one or more synthetic carbonaceous filaments include nylon, modacrylic, olefin, acrylic, polyester, rayon, vinyon, polyethylene, polyether-polyurea copolymers, vinalon, aramids, polybenzimidazole, polyhydroquinone-diimidazopyridine, thermoset liquid-crystalline polyoxazoles, aromatic polyesters, and derclon; and
    heat treating the coated current collector in an atmosphere substantially free of oxygenated gases to produce a negative electrode comprising an electroactive material layer comprising a silicon-based host material on the current collector; and
    subsequently assembling the battery cell by disposing the negative electrode and a positive electrode in an electrolyte.

12. The method of claim 11, wherein the thickness of the electroactive material layer is about 20 μm to about 50 μm.

13. The method of claim 11, wherein the one or more naturally occurring carbonaceous filaments comprise animal fibers, chitin, alginate, cellulose, keratin, and chitosan.

14. The method of claim 11, wherein the one or more naturally occurring carbonaceous filaments are selected from the group consisting of animal fibers, chitin, alginate, cellulose, keratin, and chitosan.

15. The method of claim 11, wherein the carbon present in the silicon-based host material consists of carbon derived from the one or more polymeric binders and the one or more naturally occurring carbonaceous filaments, and optionally carbon contributed from the current collector.

16. The method of claim 11, wherein the dry fraction comprises about 5 wt. % to about 95 wt. % silicon particles, about 0.1 wt. % to about 15 wt. % polymeric binders, about 1 wt. % to about 20 wt. % naturally occurring carbonaceous filaments.

17. The method of claim 11, wherein the dry fraction further comprises up to about 10 wt. % conductive carbon.

\* \* \* \* \*